(12) United States Patent
Nagura (10) Patent No.: US 8,497,469 B2
(45) Date of Patent: Jul. 30, 2013

(54) ROTARY ENCODER THAT DETECTS ROTATION ANGLE

(75) Inventor: Chihiro Nagura, Yokohama (JP)

(73) Assignee: Canon Kabushiki Kaisha (JP)

( * ) Notice: Subject to any disclaimer, the term of this patent is extended or adjusted under 35 U.S.C. 154(b) by 116 days.

(21) Appl. No.: 13/158,523

(22) Filed: Jun. 13, 2011

(65) Prior Publication Data

US 2011/0303831 A1 Dec. 15, 2011

(30) Foreign Application Priority Data

Jun. 15, 2010 (JP) ................................. 2010-136294

(51) Int. Cl.
*G01D 5/347* (2006.01)
*G01D 5/36* (2006.01)

(52) U.S. Cl.
USPC ................................. 250/231.14; 250/231.16

(58) Field of Classification Search
USPC ............ 250/216, 229, 231.1, 231.13–231.18, 250/237 R, 237 G; 356/614–619; 33/700, 33/706, 707
See application file for complete search history.

(56) References Cited

U.S. PATENT DOCUMENTS

| | | | | | |
|---|---|---|---|---|---|
| 3,241,132 | A | * | 3/1966 | Milan-Kamski | 341/7 |
| 3,757,128 | A | * | 9/1973 | Vermeulen | 250/231.16 |
| 4,606,008 | A | * | 8/1986 | Wason | 702/151 |
| 4,774,463 | A | * | 9/1988 | Mizobuchi et al. | 324/175 |
| 5,017,776 | A | * | 5/1991 | Loewen | 250/231.14 |
| 5,091,643 | A | * | 2/1992 | Okutani et al. | 250/231.14 |
| 5,214,426 | A | * | 5/1993 | Minohara et al. | 341/13 |
| 5,233,407 | A | * | 8/1993 | Ogata | 356/619 |
| 5,691,646 | A | * | 11/1997 | Sasaki | 324/662 |
| 5,694,387 | A | * | 12/1997 | Gotoh et al. | 369/53.12 |
| 6,542,088 | B1 | * | 4/2003 | Bielski et al. | 341/15 |
| 6,552,330 | B2 | * | 4/2003 | Blasing | 250/231.13 |
| 6,642,507 | B1 | * | 11/2003 | Kataoka | 250/231.13 |
| 6,958,468 | B2 | * | 10/2005 | Kataoka | 250/231.13 |
| 7,298,678 | B2 | * | 11/2007 | Bryant et al. | 369/47.38 |
| 7,875,844 | B2 | * | 1/2011 | Sheu et al. | 250/231.16 |
| 8,309,906 | B2 | * | 11/2012 | Kapner et al. | 250/231.16 |
| 2006/0039264 | A1 | * | 2/2006 | Bryant et al. | 369/100 |
| 2007/0253094 | A1 | * | 11/2007 | Hara | 360/77.08 |
| 2008/0089200 | A1 | * | 4/2008 | Neckmar | 369/53.2 |
| 2011/0069390 | A1 | * | 3/2011 | Yoshida et al. | 359/573 |
| 2011/0147572 | A1 | * | 6/2011 | Nakamura | 250/231.16 |
| 2011/0303831 | A1 | * | 12/2011 | Nagura | 250/231.14 |
| 2012/0075622 | A1 | * | 3/2012 | Nagura | 356/138 |

FOREIGN PATENT DOCUMENTS

| | | |
|---|---|---|
| JP | 64-043717 A | 2/1989 |
| JP | 02-168115 A | 6/1990 |
| JP | H07-069190 B | 7/1995 |
| JP | 11-108698 A | 4/1999 |
| JP | 2006-214929 A | 8/2006 |

* cited by examiner

*Primary Examiner* — John Lee
(74) *Attorney, Agent, or Firm* — Rossi, Kimms & McDowell LLP (57) ABSTRACT

A rotary encoder 100 includes a scale 201 that includes a spiral pattern 501 and a radial pattern 502 to be rotatable around a rotation axis, a first sensor unit 301 that detects a light transmitted through the spiral pattern 501 to output a first detection signal, a second sensor unit 302 that detects a light transmitted through the radial pattern 502 to output a second detection signal, and a signal processing circuit 401 that generates an eccentricity correction signal based on the first detection signal to correct the second detection signal based on the eccentricity correction signal. The spiral pattern 501 detects a rotational angular displacement larger than a predetermined value, and the radial pattern 502 detects a rotational angular displacement smaller than the rotational angular displacement detected by the spiral pattern 501.

10 Claims, 11 Drawing Sheets

ROTARY ENCODER THAT DETECTS ROTATION ANGLE

BACKGROUND OF THE INVENTION

1. Field of the Invention

The present invention relates to a rotary encoder that detects a rotation angle.

2. Description of the Related Art

Previously, a rotary encoder has been used for measuring an angle in a machine tool, an FA apparatus, or the like. An angle detecting method of the rotary encoder is roughly divided into an incremental method and an absolute method. In the incremental method as disclosed in Japanese Patent Laid-Open No. 2006-214929, the configuration is simple, but there are disadvantages that angle information is lost when the power is turned off and an error is accumulated by an external noise. On the other hand, the rotary encoder using the absolute method commonly has advantages that it does not accumulate errors and is highly accurate and that it is unnecessary to move to a home position even when the power is turned off.

The rotary encoder using the absolute method that detects an absolute position is, for example, disclosed in Japanese Patent Laid-Open No. H02-168115. According to the rotary encoder disclosed in Japanese Patent Laid-Open No. H02-168115, a phase synchronization of an upper-level (absolute) pattern and a lower-level (increment) pattern is performed to be able to detect a highly-accurate absolute signal.

Commonly, it is difficult to align a pattern center with a rotation center of the rotary scale in the rotary encoder, and an error of the detection angle is generated by the eccentricity generated by a mechanical error. In order to suppress the error caused by this eccentricity, Japanese Patent Publication No. H07-069190 discloses a rotary encoder which corrects a displacement signal detected by a detector for detecting the displacement using an eccentric error obtained by a detector for detecting the eccentric error. Japanese Patent Laid-Open No. H11-108698 discloses a rotary encoder which corrects an eccentricity using two detecting parts disposed at positions different by 180 degrees from each other with respect to one pattern.

However, in the rotary encoder which detects the absolute position using the upper-level detection and the lower-level detection, when a detector and a pattern that are used for detecting the eccentric error are further provided, the size of the entire scale and encoder is enlarged and the cost is increased. Even when two detecting parts are used for each of the upper-level detection and the lower-level detection, the size of the entire encoder is enlarged and the cost is increased.

SUMMARY OF THE INVENTION

The present invention provides a high-accurate, small-sized, and low-cost rotary encoder.

A rotary encoder as one aspect of the present invention includes a scale including a first pattern and a second pattern different from the first pattern and configured to be rotatable around a rotation axis, a light source configured to illuminate a light onto the scale, a first detector configured to detect a light transmitted through or reflected on the first pattern to output a first detection signal, a second detector configured to detect a light transmitted through or reflected on the second pattern to output a second detection signal, and a controller configured to generate an eccentricity correction signal based on the first detection signal to correct the second detection signal based on the eccentricity correction signal. One of the first pattern and the second pattern is a spiral pattern that is spirally formed around the rotation axis to detect a rotational angular displacement larger than a predetermined value. The other one of the first pattern and the second pattern is a radial pattern that is radially formed around the rotation axis to detect a rotational angular displacement smaller than the rotational angular displacement detected by the spiral pattern.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings.

In each of the drawings, the same elements will be denoted by the same reference numerals and the duplicate descriptions thereof will be omitted.

Embodiment 1

Figure 1:
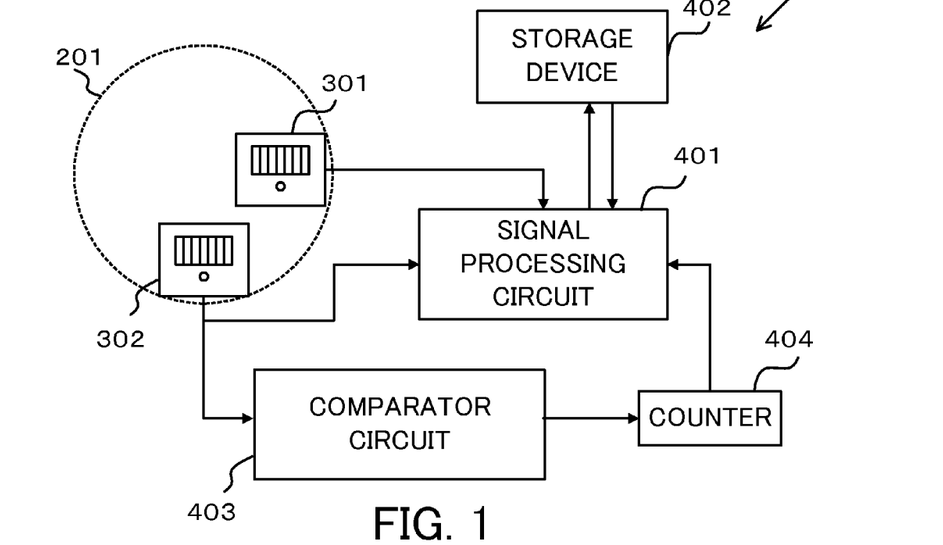
FIG. 1 is a configuration diagram of a rotary encoder in Embodiment 1.

FIG. 1 is a configuration diagram of a rotary encoder 100 in Embodiment 1. The rotary encoder 100 includes a rotary scale 201 that is attached to a rotation axis, a first sensor unit 301, a second sensor unit 302, a signal processing circuit 401, a storage device 402, a comparator circuit 403, and a counter 404. The signal processing circuit 401 performs an interpolation processing of an encoder signal obtained by each of the first sensor unit 301 and the second sensor unit 302 and performs writing and reading of the signal to a memory (the storage device).

The rotary scale 201 includes a first pattern and a second pattern that is different from the first pattern, and is a scale that is rotatable around the rotation axis. The rotary encoder 100 is provided with a light source (not shown) that illuminates a light onto the rotary scale 201. The first sensor unit 301 is a first detector that detects a light transmitted through (or reflected on) the first pattern (one pattern) to output a first detection signal. The second sensor unit 302 is a second detector that detects a light transmitted through (or reflected on) the second pattern (the other pattern) to output the second detection signal. The signal processing circuit 401 is a controller that generates an eccentricity correction signal based on the first detection signal to correct the second detection signal based on the eccentricity correction signal. The storage device 402 is a storage unit that stores the relationship of the first detection signal, the second detection signal, and the eccentricity correction signal. The signal processing circuit 401, as described below, corrects the second detection signal based on the first detection signal and the relation stored in the storage device 402.

Figure 2:
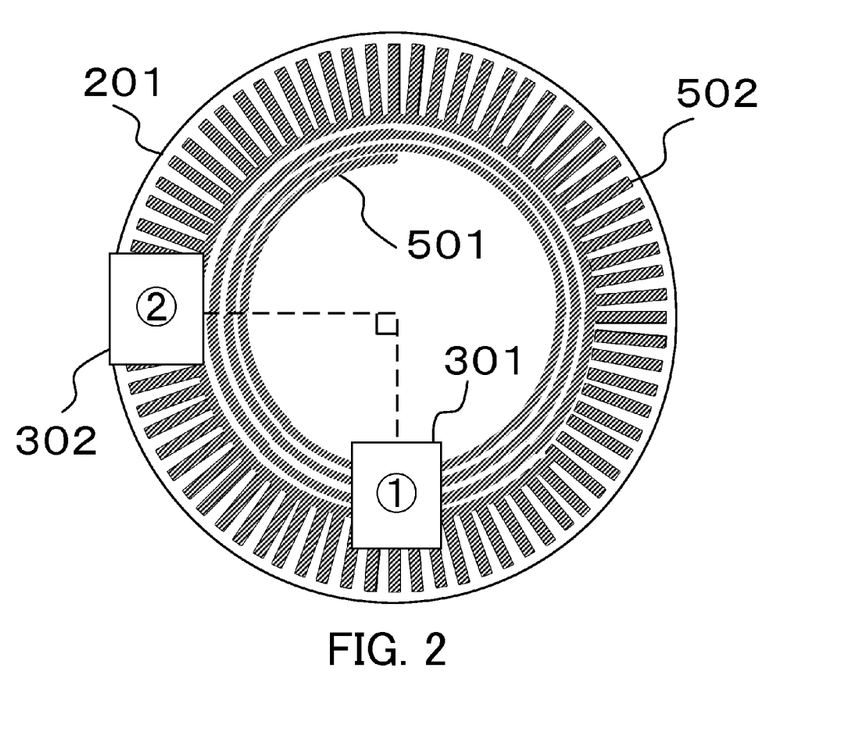
FIG. 2 is a diagram illustrating patterns of a scale and arrangements of sensor units in Embodiment 1.

FIG. 2 is a diagram illustrating the patterns of the rotary scale 201 and arrangements of the sensor units in the present embodiment. The rotary scale 201 is configured by patterning a chromium reflection film spirally and radially on a glass substrate. In other words, the rotary scale 201 includes a spiral pattern 501 as the first pattern and a radial pattern 502 as the second pattern. The spiral pattern 501 is spirally formed around the rotation axis, and detects a rotational angular displacement which is larger than a predetermined value. On the other hand, the radial pattern 502 is radially formed around the rotation axis, and detects a rotational angular displacement which is smaller than the rotational angular displacement detected by the spiral pattern 501.

The spiral pattern 501 is formed inside the radial pattern 502 with reference to the rotation axis. It is also formed along a center line represented by expressions of $r=a \times \theta$ and $a=TP1/360$, where r is a radius from the pattern center, $\theta$ is an azimuth angle when the pattern center is treated as an axis, and TP1 is a pitch in a radial direction of a reflection slit. A width d of the reflection slit is represented as $d=a \times 180=TP1/2$. In the present embodiment, TP1=100 μm and a=0.278 μm/deg are met. The radial pattern 502 at the outer circumference side is formed by 512 reflection slits per one circle, and a pitch TP2 in a circumferential direction has a relation of TP2=TP1. The slit width is TP2/2. The radial pattern 502 is disposed at the outer side of the spiral pattern 501 to be able to improve the maximum resolution.

The first sensor unit 301 is disposed so as to read a signal from the spiral pattern 501. The second sensor unit 302 is disposed so as to read a signal from the radial pattern 502. The first sensor unit 301 and the second sensor unit 302 are disposed at positions that are rotated by 90 degrees each other around a rotation central axis (the rotation axis).

Figure 3:
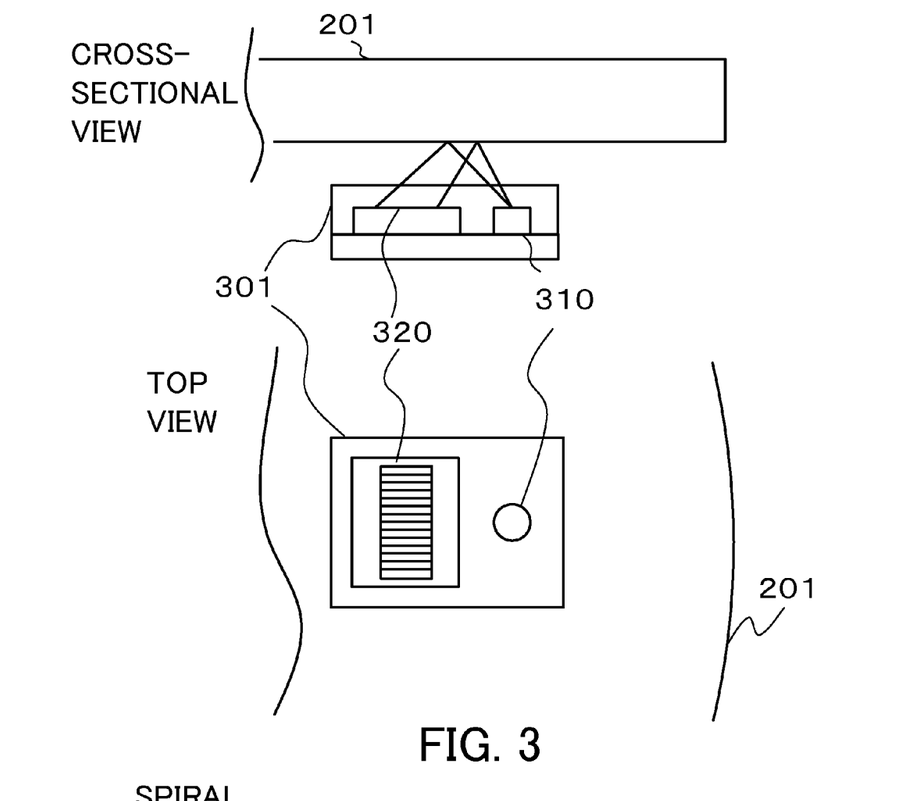
FIG. 3 is a diagram illustrating the sensor unit in Embodiment 1.

FIG. 3 is a diagram illustrating a sensor unit in the present embodiment. In FIG. 3, a cross-sectional view and a plan view (top view) are illustrated. Each of the first sensor unit 301 and the second sensor unit 302 is a light emitting/receiving integrated sensor unit in which an LED 310 and a photo diode array 320 are mounted in the same package. Since a method of using a light-receiving element array that is also provided as an index scale in an optical encoder as this sensor is, for example, disclosed in Japanese Patent Laid-Open No. 2006-214929 in detail, descriptions of a detection principle of the encoder signal are omitted.

A divergent light emitted from the LED 310 (the light source) in the first sensor unit 301 is illuminated onto the spiral pattern 501 of the rotary scale 201 to be reflected to a photo diode array 320 in the first sensor unit 301. The light received by the photo diode array 320 is converted into an electric signal to be sent to the signal processing circuit 401 as a spiral encoder signal (the first detection signal). The interpolation processing for the spiral encoder signal obtained from the first sensor unit 301 is performed by using the arctangent calculation in the signal processing circuit 401 to obtain a spiral pattern signal θspiral.

A divergent light emitted from the LED 310 in the second sensor unit 302 is illuminated onto the radial pattern 502 of the rotary scale 201 to be reflected to a photo diode array 320 in the second sensor unit 302. The light received by the photo diode array 320 is converted into an electric signal to be sent to the signal processing circuit 401 as an incremental encoder signal (the second detection signal). The interpolation processing for the incremental encoder signal obtained from the second sensor unit 302 is performed by using the arctangent calculation in the signal processing circuit 401 to obtain an increment output θinc. At the same time, the incremental encoder signal sent to the comparator circuit 403 is binarized by a predetermined threshold value, and a pulse count using a counter is performed. As a result, the number of the increment slits (increment count value C) is obtained.

First of all, an initial operation sequence will be described. The rotary scale 201 is rotated to obtain the spiral pattern signals θspiral and the increment count values C at an edge timing of the binary signal of the increment signal for at least one cycle. In this case, an eccentricity correction signal Err that is represented by the following Expression (1) is calculated to be obtained.

$$Err = \theta spiral - C \times 2\pi/512 \tag{1}$$

Then, the relation of the eccentricity correction signal Err, the spiral pattern signal θspiral, and the increment slit count value Count is stored in the storage device 402. The above relation may also be stored as a function expression.

Figure 4:
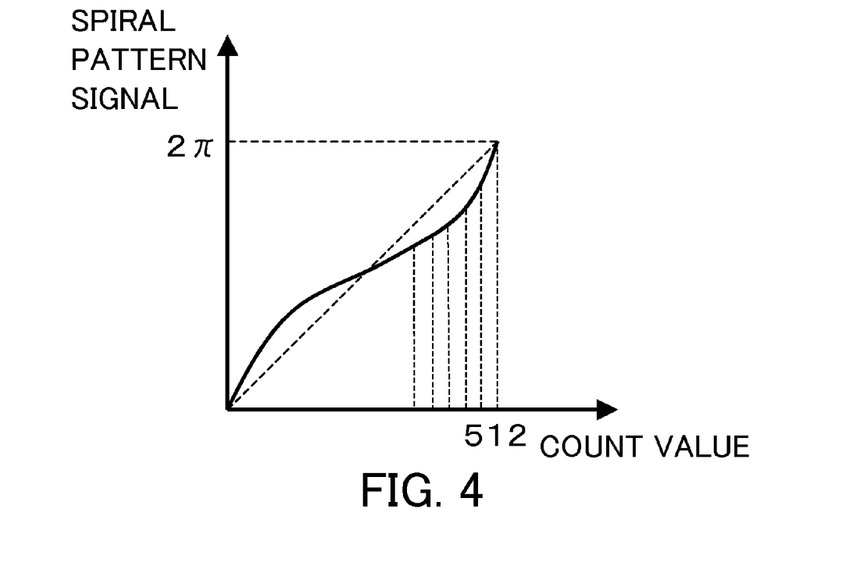
FIG. 4 is a graph illustrating a relationship between a count value of an increment slit and a spiral pattern signal in Embodiment 1.
Figure 5:
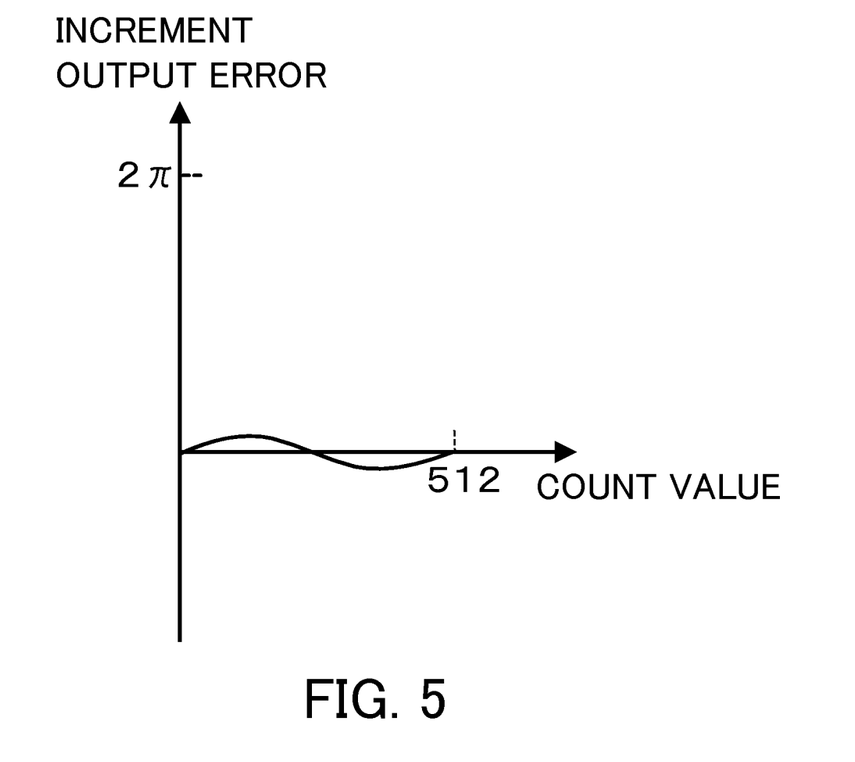
FIG. 5 is a graph illustrating a relationship between a count value of an increment slit and an error amount of an increment output caused by an eccentricity in Embodiment 1.

When a lateral axis is indicated as a count value of the increment slit and a vertical axis is indicated as an output from the spiral slit, the relation illustrated in the graph of FIG. 4 is obtained. When the lateral axis is indicated as a count value of the increment slit and the vertical axis is indicated as an error amount caused by the eccentricity of the increment output θinc, the relation illustrated in the graph of FIG. 5. When the first sensor unit 301 and the second sensor unit 302 have the position relation of 90 degrees with reference to the rotation axis of the rotary scale 201, a phase of this error is equal to a phase of the eccentricity correction signal Err. Even when the position relation of each sensor unit is other than 90 degrees, the phase of the stored eccentricity correction signal Err may be corrected. When detection pitches of the first sensor unit 301 and the second sensor unit 302 are equal to each other, error amplitudes are also equal to each other. Even when the detection pitches are different from each other, it can be applied by multiplying a factor of the sensitivity ratio by the eccentricity correction signal Err.

Next, a real angle detection operation will be described. Based on the above theory, the correction of the increment output θinc is performed. First of all, a comparative calculation is performed with reference to a table based on the obtained spiral output θspiral to identify a corresponding increment slit of 512 increment slits and also to read the eccentricity correction signal Err. Then, the eccentricity correction signal Err is subtracted from the increment output θinc to correct the error caused by the eccentricity.

Based on the increment slit identified as described above and the correction result of the increment output θinc, an absolute angle position signals in which the eccentric error is suppressed can be obtained throughout the circumference. Then, the initial operation may also be performed again when a constant time has been passed or a constant temperature has been changed. In the present embodiment, a reflective encoder is used, but a transmissive encoder may also be used. The light receiving element and the light emitting element may also be configured separately.

As described above, according to the present embodiment, since the spiral pattern and the radial pattern are included and a signal of a lower-level (radial) pattern is corrected based on a signal of upper-level (spiral) pattern, reducing the size and lowering the cost can be achieved while a high-accurate absolute detection is realized.

Embodiment 2

Figure 6:
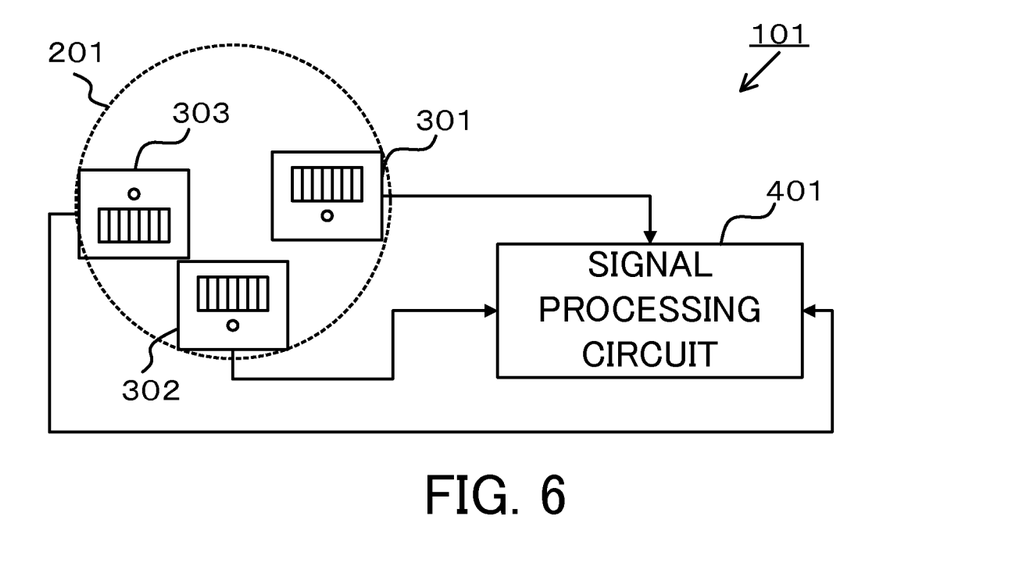
FIG. 6 is a configuration diagram of a rotary encoder in Embodiment 2.

FIG. 6 is a configuration diagram of a rotary encoder 101 in Embodiment 2. The rotary encoder 101 is configured by including a rotary scale 201 that is attached to the rotation axis, a first sensor unit 301, a second sensor unit 302, a third sensor unit 303, and a signal processing circuit 401.

Figure 7:
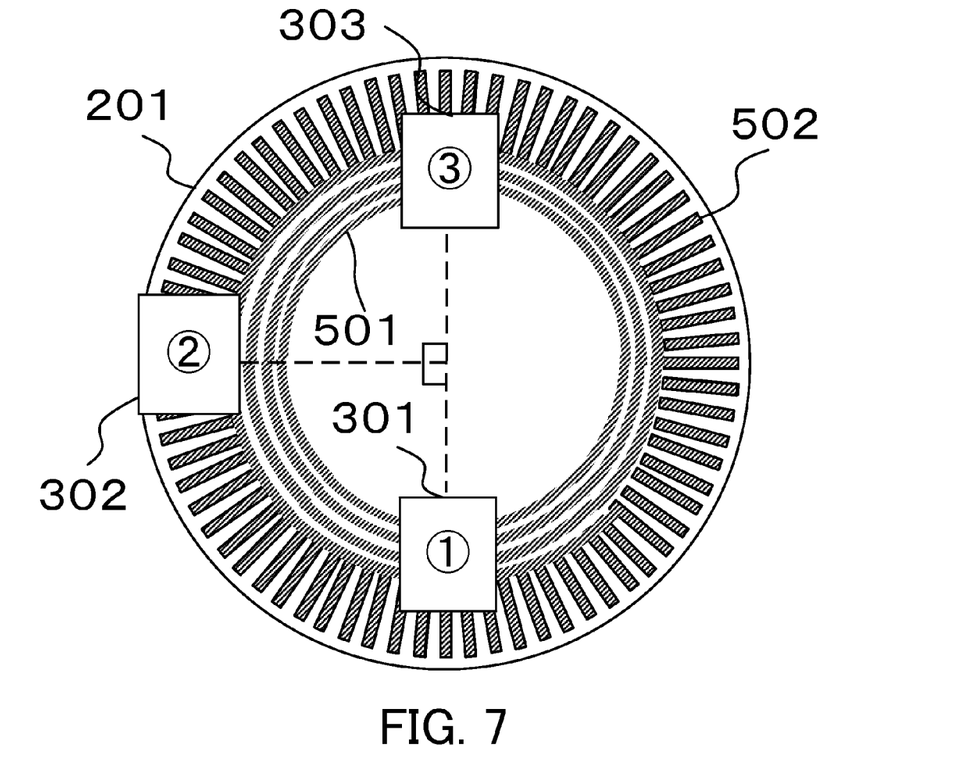
FIG. 7 is a diagram illustrating patterns of a scale and arrangements of sensor units in Embodiment 2.

FIG. 7 is a diagram illustrating patterns of the scale and arrangements of the sensor units in the present embodiment. The patterns of the scale are the same as the patterns of Embodiment 1. The first sensor unit 301 and the third sensor unit 303 (two detecting parts) are a first detector that detects a light transmitted through (or reflected on) a spiral pattern 501 as a first pattern. The first sensor unit 301 and the third sensor unit 303 are disposed at positions rotated around a rotary shift by 180 degrees from each other so as to read a signal from the spiral pattern 501. The second sensor unit 302 as a second detector is disposed at a position rotated around the rotation axis by 90 degrees with respect to the two detecting parts so as to read a signal from a radial pattern 502. The signal processing circuit 401, as described below, generates an eccentricity correction signal based on a first detection signal that is detected by the two detecting parts to correct a second detection signal.

Divergent lights emitted from LEDs 310 inside the first sensor unit 301 and the third sensor unit 303 are illuminated onto the spiral pattern 501 to be reflected to photo diode arrays 320 inside the first sensor unit 301 and the third sensor unit 303. The light received by the photo diode array 320 is converted into an electric signal to be sent to the signal processing circuit 401 as a spiral encoder signal. An interpolation processing is performed for the spiral encoder signals obtained from the first sensor unit 301 and the third sensor unit 303 by an arctangent calculation in the signal processing circuit 401, and as a result spiral pattern signals θspiral_1 and θspiral_3 are obtained, respectively.

A divergent light emitted from an LED 310 inside the second sensor unit 302 is illuminated onto the spiral pattern 502 of the rotary scale 201 to be reflected to a photo diode array 320 inside the second sensor unit 302. The light received by the photo diode array 320 is converted into an electric signal to be sent to the signal processing circuit 401 as an incremental encoder signal. An interpolation processing is performed for the incremental encoder signal obtained from the second sensor unit 302 by an arctangent calculation in the signal processing circuit 401, and as a result an increment output θinc is obtained.

An upper-level absolute signal θspiral is obtained by the calculation represented as the following Expression (2).

$$\theta spiral=(\theta spiral\_1+\theta spiral\_3)/2 \qquad (2)$$

In this case, due to turning back of the phase, the signal is treated as two cycles in one circle and positions symmetric by 180 degrees to each other cannot be determined, but it can be determined by using a memory or adding zone detection. For example, it can be determined by storing the relation between θspiral_1 and θspiral.

The eccentricity correction signal Err is obtained by the calculation represented as the following Expression (3).

$$Err=(\theta spiral\_1-\theta spiral\_3)/2 \qquad (3)$$

Figure 8:
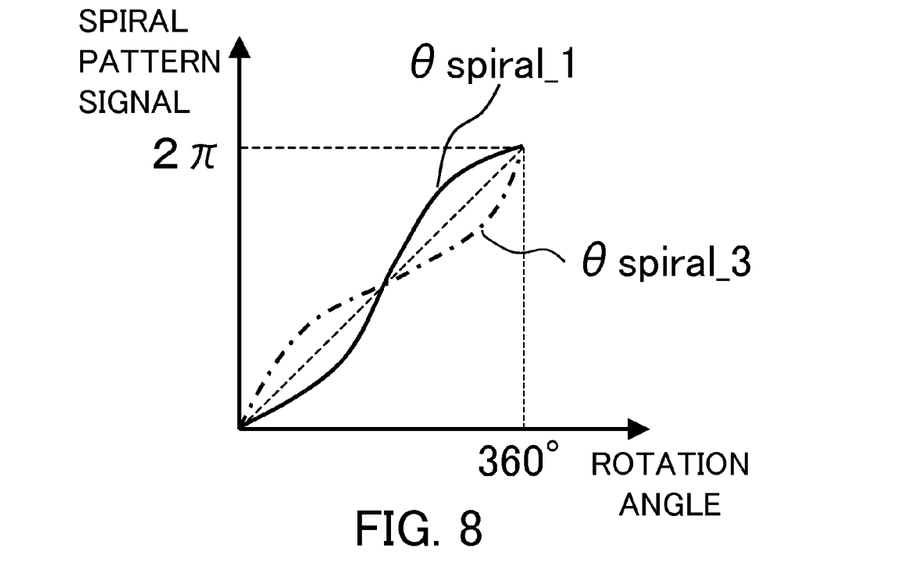
FIG. 8 is a graph illustrating a relationship between a rotation angle and spiral pattern signals spiral_1 and θspiral_3 in Embodiment 2.
Figure 9:
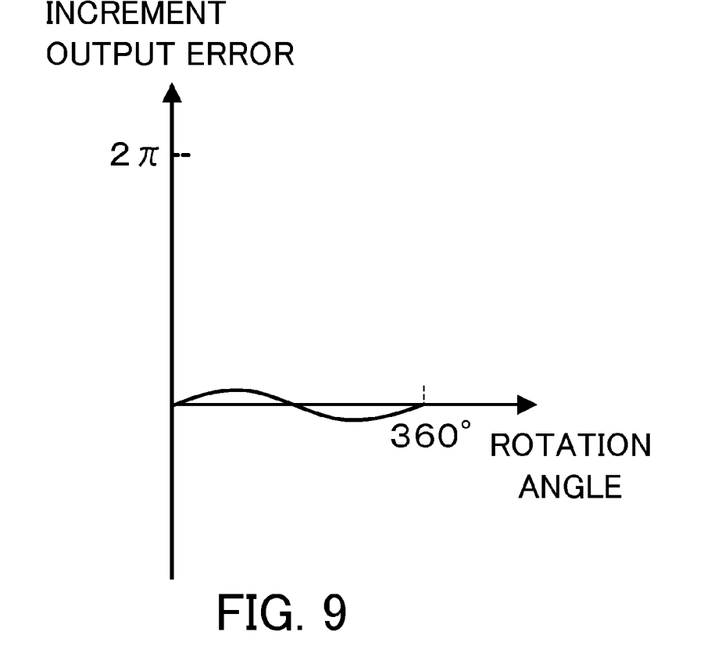
FIG. 9 is a graph illustrating a relationship between a rotation angle and an error amount of an increment output θinc caused by an eccentricity in Embodiment 2.

The relation illustrated in a graph of FIG. 8 is obtained when a lateral axis indicates the rotation angle and a vertical axis indicates the spiral pattern signals θspiral_1 and θspiral_3. Furthermore, the relation illustrated in a graph of FIG. 9 is obtained when a vertical axis indicates an error amount caused by the eccentricity of the increment output θinc. When the first sensor unit 301 and the second sensor unit 302 have a relation of 90 degrees with respect to the rotation axis of the rotary scale 201, the phase of this error is equal to the phase of the eccentricity correction signal Err. When the detection pitches of the first sensor unit 301, the second sensor unit 302, and the third sensor unit 303 are equal to each other, their error amplitudes are also equal to each other. Even if the detection pitches are different from each other, the embodiment is applicable by multiplying the eccentricity correction signal Err by a factor corresponding to a sensitivity ratio.

Next, a real angle detection operation will be described. The eccentricity correction signal Err is subtracted from the increment output θinc based on the above theory to correct the error caused by the eccentricity. Based on the upper-level absolute signal θspiral and the correction results of the increment output θinc obtained as described above, an absolute angle position signals in which eccentric errors are suppressed can be obtained over the entire circumference. The reflective encoder is used in the present embodiment, but a transmissive encoder can also be used. The light receiving element and the light emitting element may also be configured separately.

As described above, in the present embodiment, the spiral pattern and the radial pattern are included to detect the eccentric error based on the signal of the upper-level (spiral) pattern in a real time to correct the signal of the lower-level (radial) pattern. Therefore, the initialization is unnecessary and an error such as a bearing backlash that has not reproducibility can also be corrected.

Embodiment 3

Figure 10:
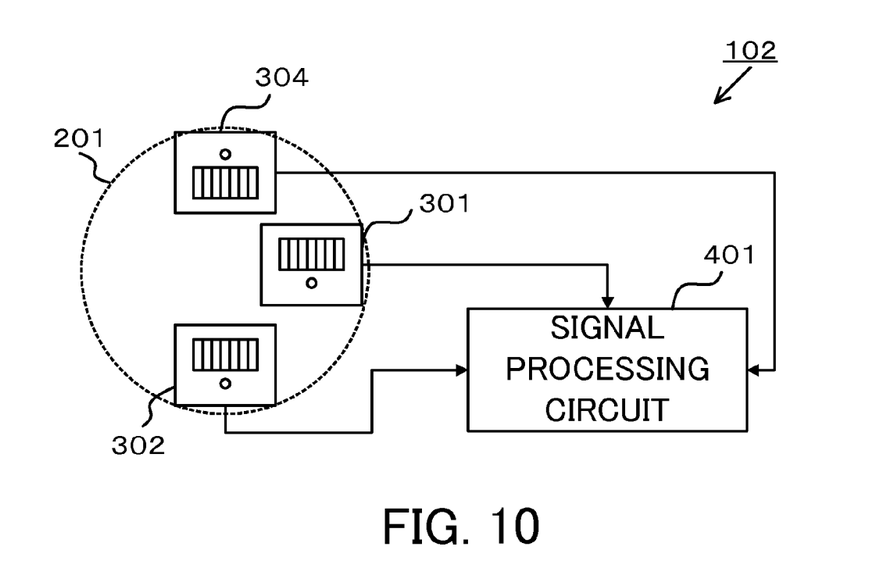
FIG. 10 is a configuration diagram of a rotary encoder in Embodiment 3.

FIG. 10 is a configuration diagram of a rotary encoder 102 in Embodiment 3. The rotary encoder 102 is configured by including a rotary scale 201 that is attached to a rotation axis, a first sensor unit 301, a second sensor unit 302, a fourth sensor unit 304, and a signal processing circuit 401.

Figure 11:
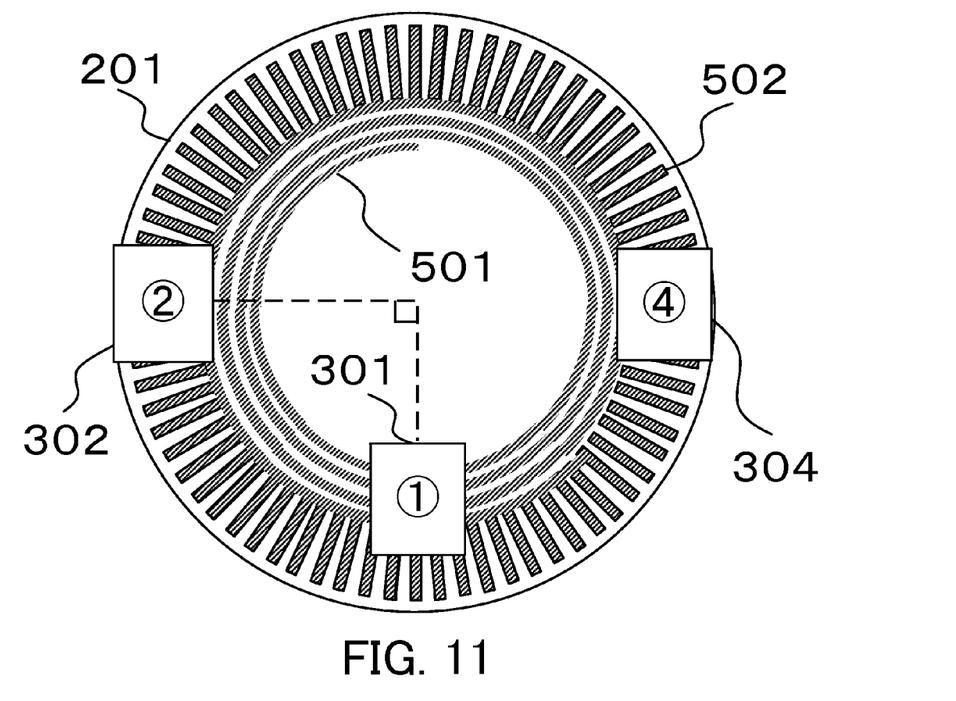
FIG. 11 is a diagram illustrating patterns of a scale and arrangements of sensor units in Embodiment 3.

FIG. 11 is a diagram illustrating patterns of the scale and arrangements of the sensor units. The patterns of the scale are the same as the patterns of Embodiment 1. The first sensor unit 301 is disposed so as to read a signal from a spiral pattern 501 as a second pattern. The second sensor unit 302 and the fourth sensor unit 304 are disposed so as to read a signal from a radial pattern 502 as a first pattern. The second sensor unit 302 and the fourth sensor unit 304 are attached to positions rotated by 180 degrees each other with respect to a rotation central axis. The first sensor unit 301 and the second sensor unit 302 are attached to positions rotated by 90 degrees each other with respect to the rotation central axis.

A divergent light emitted from an LED 310 inside the first sensor unit 301 is illuminated onto the spiral pattern 501 of the rotary scale 201 to be reflected to a photo diode array 320 inside the first sensor unit 301. The light received by the photo diode array 320 is converted into an electric signal to be sent to the signal processing circuit 401 as a spiral encoder signal. An interpolation processing is performed for the spiral encoder signals obtained from the first sensor unit 301 by an arctangent calculation in the signal processing circuit 401, and as a result a spiral pattern signal θspiral is obtained.

Divergent lights emitted from LEDs 310 inside the second sensor unit 302 and the fourth sensor unit 304 are illuminated onto the radial pattern 502 of the rotary scale 201. Then, the lights are reflected to photo diode arrays 320 inside the second sensor unit 302 and the fourth sensor unit 304. The light received by the photo diode array 320 is converted into an electric signal to be sent to the signal processing circuit 401 as an incremental encoder signal. An interpolation processing is performed for the incremental encoder signals obtained from the second sensor unit 302 and the fourth sensor unit 304 by arctangent calculations in the signal processing circuit 401, and as a result increment outputs θinc_2 and θinc_4 are obtained, respectively. The increment output θinc whose eccentricity has been corrected is obtained by the following Expression (4).

$$\theta inc=(\theta inc\_2+\theta inc\_4)/2 \quad (4)$$

The eccentricity correction signal Err is obtained by the following Expression (5).

$$Err=(\theta inc\_2+\theta inc\_4)/2 \quad (5)$$

Figure 12:
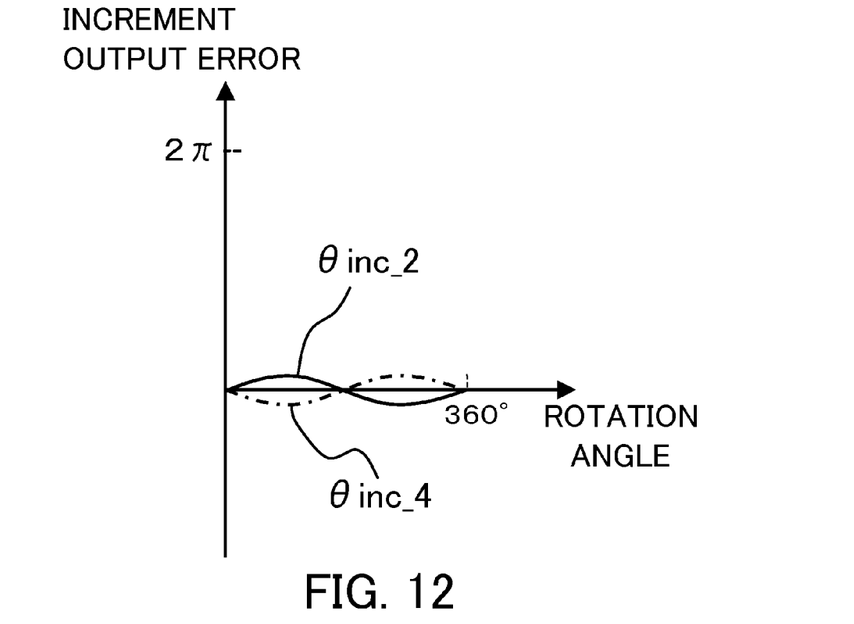
FIG. 12 is a graph illustrating a relationship between a rotation angle and increment outputs θinc_2 and θinc_4 in Embodiment 3.
Figure 13:
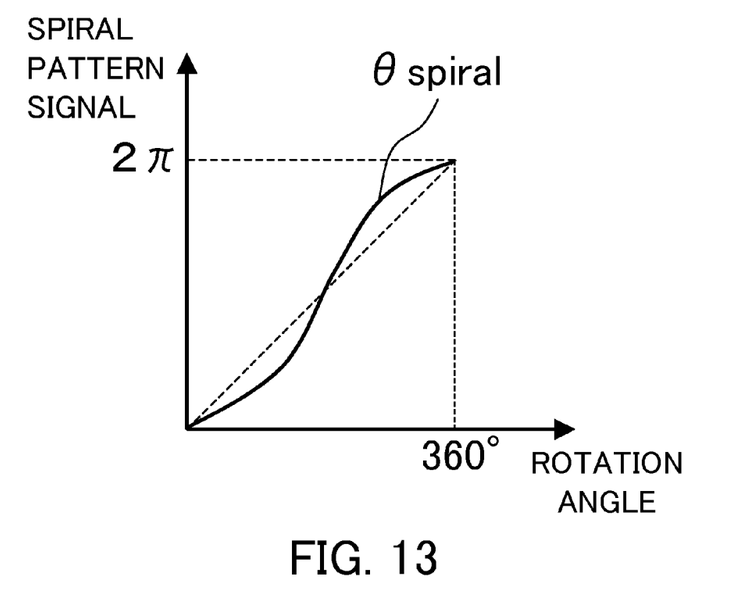
FIG. 13 is a graph illustrating a relationship between a rotation angle and a spiral pattern signal θspiral in Embodiment 3.

The relation illustrated in a graph of FIG. 12 is obtained when a lateral axis indicates the rotation angle and a vertical axis indicates the increment outputs θinc_2 and θinc_4. Furthermore, the relation illustrated in a graph of FIG. 13 is obtained when a vertical axis indicates the spiral pattern signal θspiral. When the first sensor unit 301 and the second sensor unit 302 have a relation of 90 degrees different from each other with respect to the rotation axis of the rotary scale 201, the phase of this error is equal to the phase of the eccentricity correction signal Err. When the detection pitches of the first sensor unit 301, the second sensor unit 302, and the fourth sensor unit 304 are equal to each other, their error amplitudes are also equal to each other. Even if the detection pitches are different from each other, the embodiment is applicable by multiplying the eccentricity correction signal Err by a factor corresponding to a sensitivity ratio.

Next, a real angle detection operation will be described. The eccentricity correction signal Err is subtracted from the spiral pattern output θspiral based on the above theory to correct the error caused by the eccentricity. Based on the correction result of the spiral pattern signal θspiral and the increment output θinc obtained as described above, an absolute angle position signals in which eccentric errors are suppressed can be obtained over the entire circumference.

As described above, in the present embodiment, the spiral pattern and the radial pattern are included to detect the eccentric error based on the signal of the lower-level (radial) pattern in a real time to correct the signal of the upper-level (spiral) pattern. Therefore, similarly to Embodiment 2, the initialization is unnecessary and an error such as a bearing backlash that has not reproducibility can also be corrected.

Embodiment 4

Figure 14:
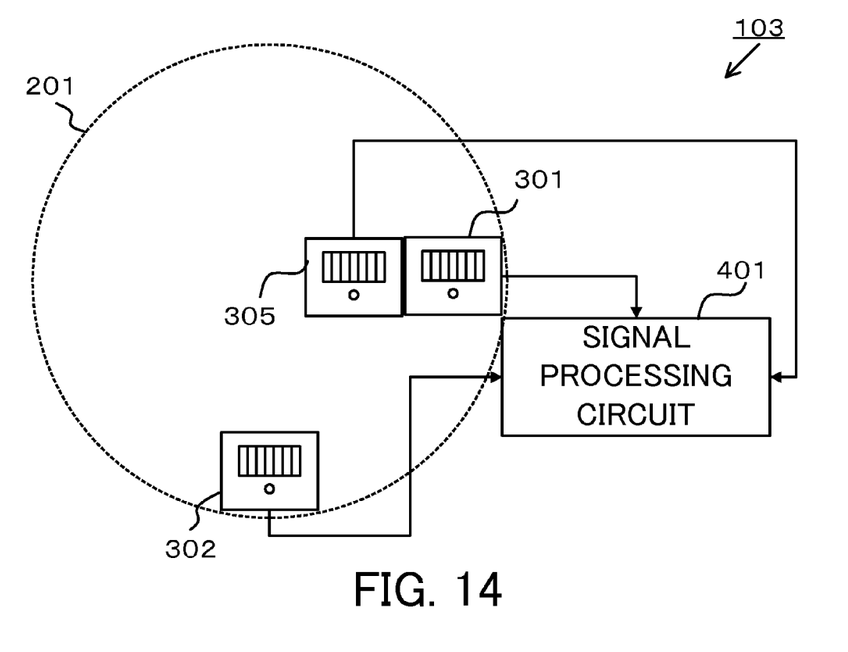
FIG. 14 is a configuration diagram of a rotary encoder in Embodiment 4.

FIG. 14 is a configuration diagram of a rotary encoder 103 in Embodiment 4. The rotary encoder 103 is configured by including a rotary scale 201 attached to a rotation axis, a first sensor unit 301, a second sensor unit 302, a fifth sensor unit 305, and a signal processing circuit 401.

Figure 15:
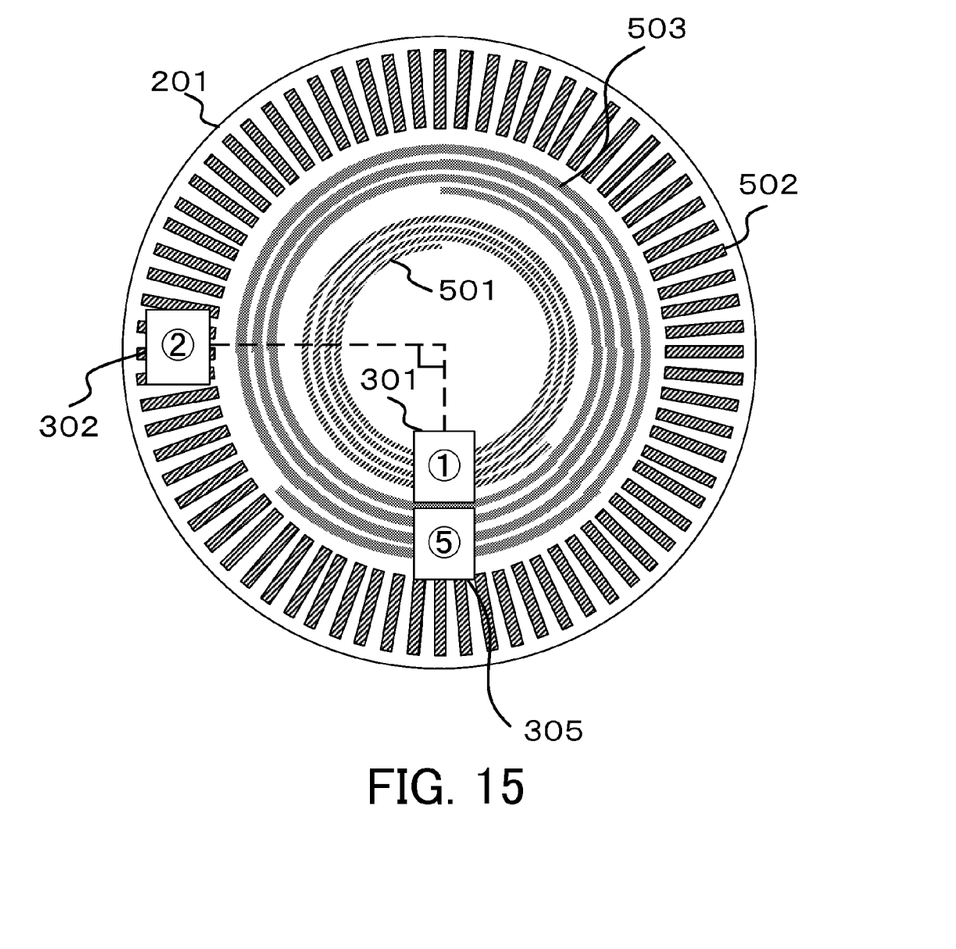
FIG. 15 is a diagram illustrating patterns of a scale and arrangements of sensor units in Embodiment 4.

FIG. 15 is a diagram illustrating patterns of the scale and arrangements of the sensor units in the present embodiment. The rotary scale 201 is configured by patterning a chromium reflection film on a glass substrate in a spiral shape, an inverted spiral shape, and a radial shape. Thus, in the present embodiment, the spiral pattern is configured by including a spiral pattern 501 (a first spiral pattern) in a first direction and an inverted spiral pattern 503 (a second spiral pattern) in a direction opposite to the first direction.

The spiral pattern 501 at the inner circumference side is formed along a center line represented by expressions of $r=a \times \theta$ and $a=TP1/360$, where r is a radius from the pattern center, θ is an azimuth angle when the pattern center is treated as a shaft, and TP1 is a pitch in a radial direction of a reflection slit. A width d of the reflection slit is represented as $d=a \times 180=TP1/2$. In the present embodiment, TP1=100 μm and a=0.278 μm/deg are met. The inverted spiral pattern 503 at the intermediate circumference is formed along a center line represented by expressions of $r=-a \times \theta$ and $a=TP1/360$, where r is a radius from the pattern center, θ is an azimuth angle when the pattern center is treated as a shaft, and TP1 is a pitch in a radial direction of the reflection slit. The width d of the reflection slit is represented as $d=a \times 180=TP1/2$. In the present embodiment, TP1=100 μm and a=0.278 μm/deg are met.

The radial pattern 502 at the outer circumference side is formed by 512 reflection slits per one circle, and a pitch TP2 in a circumferential direction has a relation of TP2=TP1. The slit width is TP2/2. The first sensor unit 301 is disposed so as to read a signal from the spiral pattern 501. The fifth sensor unit 305 is disposed so as to read a signal from the inverted spiral pattern 503. The second sensor unit 302 is disposed so as to read a signal from the radial pattern 502. The first sensor unit 301 and the second sensor unit 302 are attached to positions of 90 degrees relative to each other with respect to a rotation central axis. The first sensor unit 301 and the fifth sensor unit 305 are attached to the same direction with respect to the rotation central axis.

A divergent light emitted from an LED 310 inside the first sensor unit 301 is illuminated onto the spiral pattern 501 of the rotary scale 201 to be reflected to a photo diode array 320 inside the first sensor unit 301. The light received by the photo diode array 320 is converted into an electric signal to be sent to the signal processing circuit 401 as a spiral encoder signal. An interpolation processing is performed for the spiral encoder signals obtained from the first sensor unit 301 by an arctangent calculation in the signal processing circuit 401, and as a result a spiral pattern signal θspiral_1 is obtained.

A divergent light emitted from an LED 310 inside the fifth sensor unit 305 is illuminated onto the inverted spiral pattern 503 of the rotary scale 201 to be reflected to a photo diode array 320 inside the fifth sensor unit 305. The light received by the photo diode array 320 is converted into an electric signal to be sent to the signal processing circuit 401 as an inverted spiral encoder signal. An interpolation processing is performed for the inverted spiral encoder signals obtained from the fifth sensor unit 305 by an arctangent calculation in the signal processing circuit 401, and as a result an inverted spiral pattern signal θspiral_2 is obtained.

A divergent light emitted from an LED 310 inside the second sensor unit 302 is illuminated onto the radial pattern 502 of the rotary scale 201 to be reflected to a photo diode array 320 inside the second sensor unit 302. The light received by the photo diode array 320 is converted into an electric signal to be sent to the signal processing circuit 401 as an incremental encoder signal. An interpolation processing is performed for the incremental encoder signal obtained from the second sensor unit 302 by an arctangent calculation in the signal processing circuit 401, and as a result an increment output θinc is obtained.

An upper-level absolute signal θspiral is obtained by the calculation represented as the following Expression (6).

$$\theta spiral=(\theta spiral\_1-\theta spiral\_3)/2 \quad (6)$$

In this case, due to turning back of the phase, the signal is treated as two cycles in one circle and positions symmetric by 180 degrees to each other cannot be determined. However, it can be determined by using a memory or adding zone detection. For example, it can be determined by storing the relation between θspiral_1 and θspiral. The eccentricity correction signal Err is obtained by the calculation represented as the following Expression (7).

$$Err=(\theta spiral\_1+\theta spiral\_3)/2 \quad (7)$$

Figure 16:
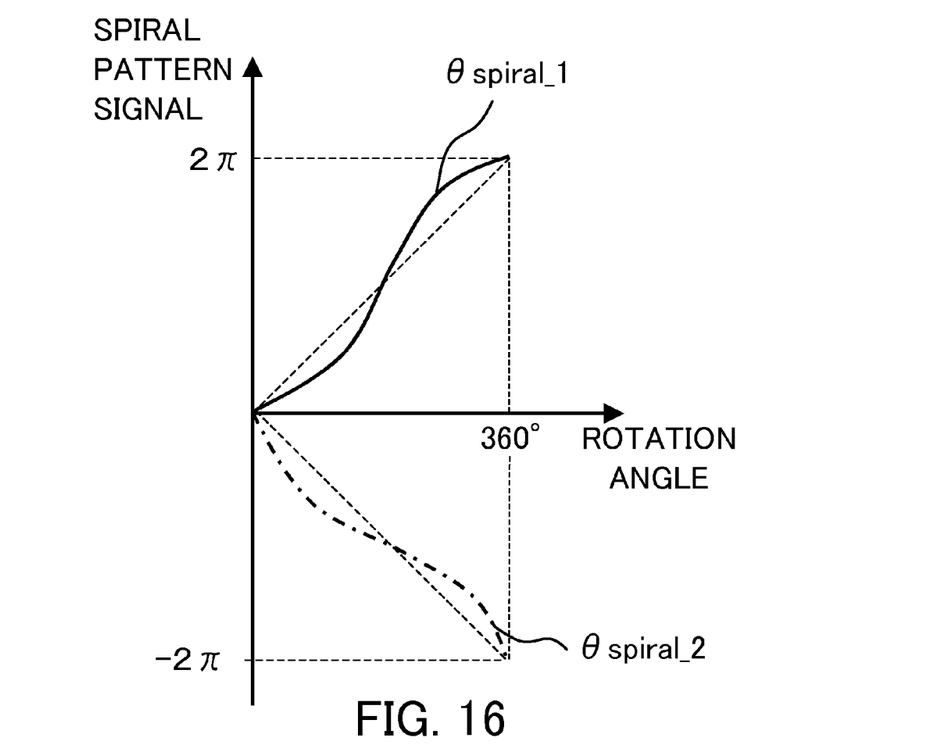
FIG. 16 is a graph illustrating a relationship between a rotation angle and a spiral pattern signal θspiral_1 and an inverted spiral pattern signal θspiral_2 in Embodiments 4 and 5.
Figure 17:
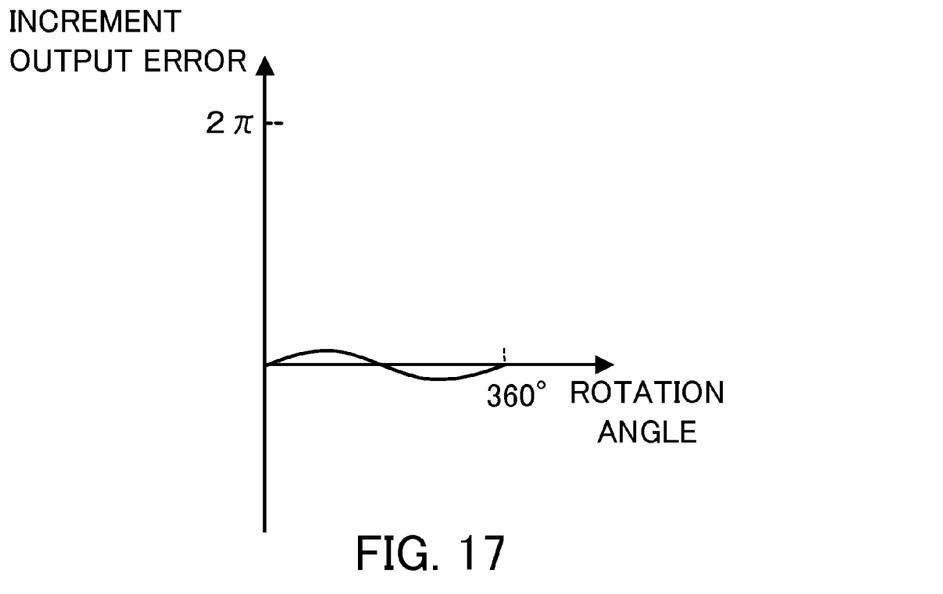
FIG. 17 is a graph illustrating a relationship between a rotation angle and an error amount of an increment output θinc caused by an eccentricity in Embodiments 4 and 5.

The relation illustrated in a graph of FIG. 16 is obtained when a lateral axis indicates the rotation angle and a vertical axis indicates the spiral pattern signals θspiral_1 and the inverted spiral pattern signal θspiral_2. Furthermore, the relation illustrated in a graph of FIG. 17 is obtained when a vertical axis indicates an error amount caused by the eccentricity of the increment output θinc. When the first sensor unit 301 and the second sensor unit 302 have a relation of 90 degrees different from each other with respect to the rotation axis of the rotary scale 201, the phase of this error is equal to the phase of the eccentricity correction signal Err. When the detection pitches of the first sensor unit 301, the second sensor unit 302, and the third sensor unit 303 are equal to each other, their error amplitudes are also equal to each other. Even if the detection pitches are different from each other, the embodiment is applicable by multiplying the eccentricity correction signal Err by a factor corresponding to a sensitivity ratio.

Next, a real angle detection operation will be described. The eccentricity correction signal Err is subtracted from the increment output θinc based on the above theory to correct the error caused by the eccentricity. Based on the upper-level absolute signal θspiral and the correction result of the increment output θinc obtained as described above, an absolute angle position signals in which eccentric errors are suppressed can be obtained over the entire circumference.

In the present embodiment, a reflective encoder is used, but a transmissive encoder may also be used. The light receiving element and the light emitting element may also be configured separately. Furthermore, anyone of the spiral pattern and the inverted spiral pattern can be a concentric pattern.

As described above, the present embodiment is configured by including the spiral and inverted spiral patterns and the radial pattern so as to detect the eccentric error based on the signal of the upper-level (spiral) pattern in a real time to correct the signal of the lower-level (radial) pattern. Therefore, the positions of the sensors can be collected to one side and easy arrangements can be performed.

Embodiment 5

Figure 18:
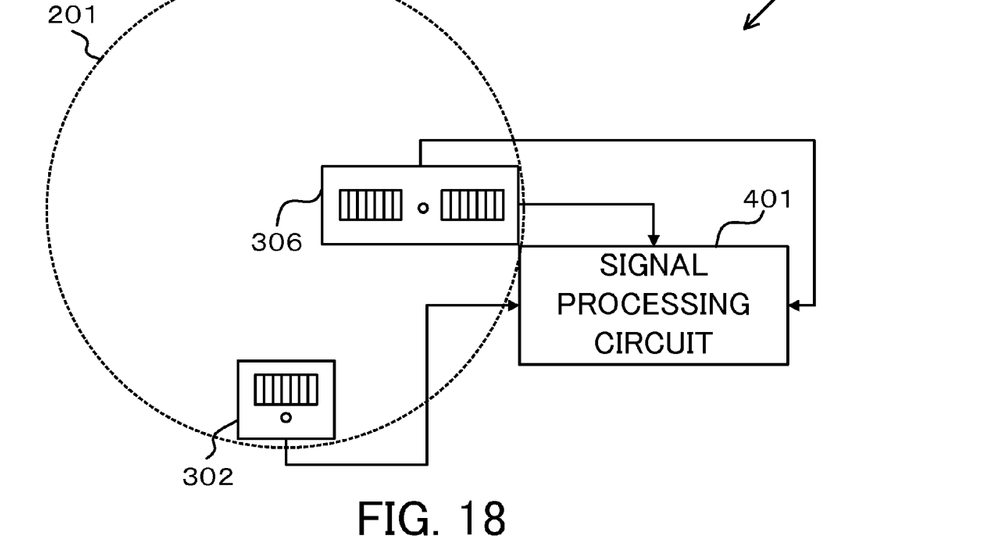
FIG. 18 is a configuration diagram of a rotary encoder in Embodiment 5.

FIG. 18 is a configuration diagram of a rotary encoder 104 in Embodiment 5. The rotary encoder 104 is configured by including a rotary scale 201 that is attached to a rotation axis, a second sensor unit 302, a sixth sensor unit 306, and a signal processing circuit 401.

Figure 19:
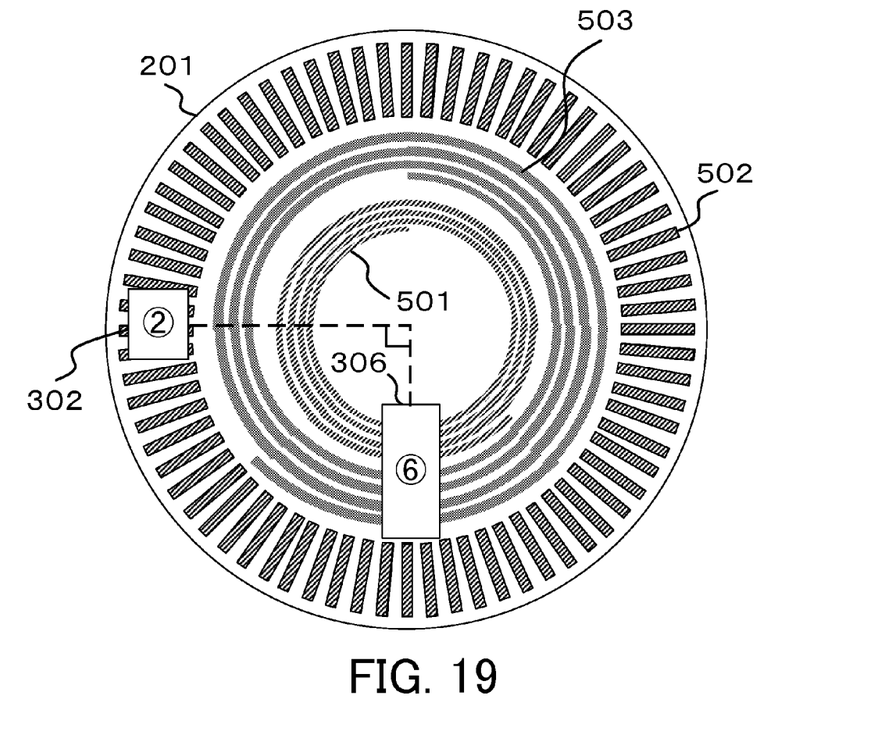
FIG. 19 is a diagram illustrating patterns of a scale and arrangements of sensor units in Embodiment 5.

FIG. 19 is a diagram illustrating patterns of the scale and arrangements of the sensor units in the present embodiment. The patterns of the scale are the same as the patterns of Embodiment 4. The sixth sensor unit 306 is disposed so as to read signals from a spiral pattern 501 and an inverted spiral pattern 503. The second sensor unit 302 is disposed so as to read a signal from a radial pattern 502. The sixth sensor unit 306 and the second sensor unit 302 are attached to positions relatively different by 90 degrees from each other with respect to the rotation central axis.

Figure 20:
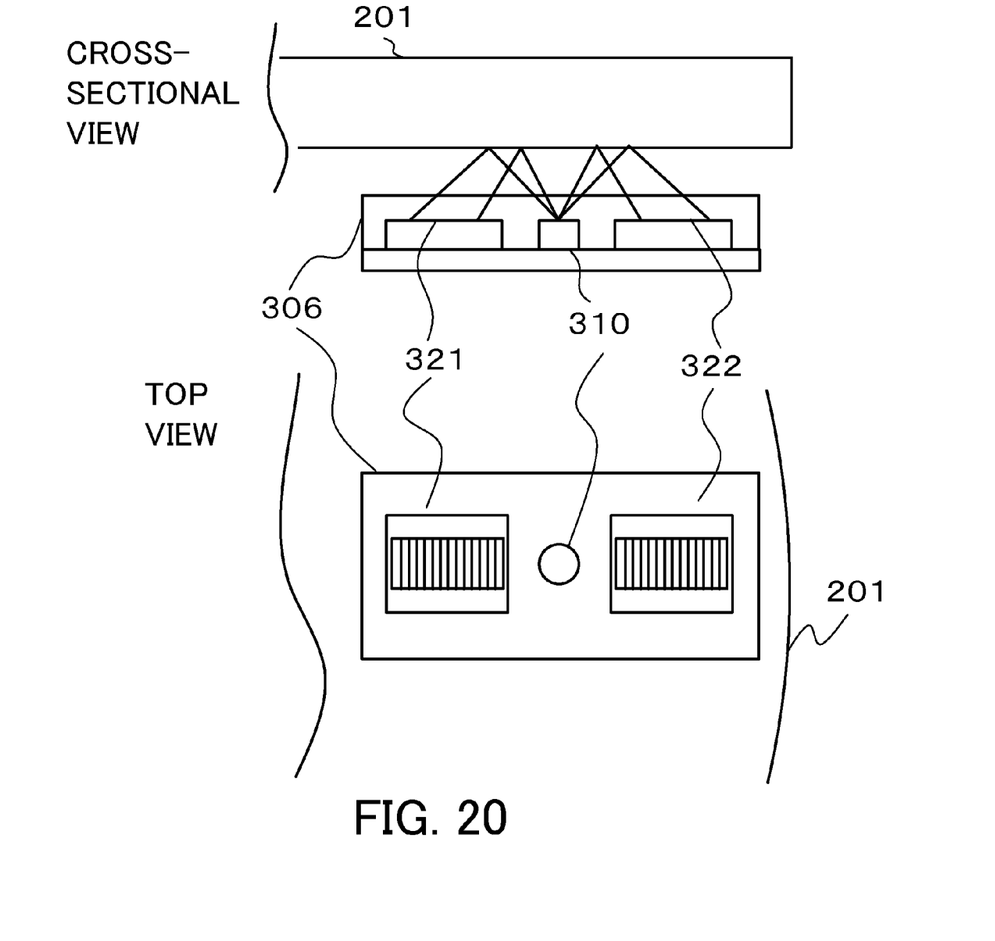
FIG. 20 is a diagram illustrating the sensor unit in Embodiment 5.

FIG. 20 is a diagram illustrating the sensor unit in the present embodiment. A divergent light emitted from an LED 310 inside the sixth sensor unit 306 is illuminated onto the spiral pattern 501 and the inverted spiral pattern 503 of the rotary scale 201. Then, they are reflected to a first photo diode array 321 and a second photo diode array 322 inside the sixth sensor unit 306, respectively. The light received by each the photo diode array is converted into an electric signal to be sent to the signal processing circuit 401 as a spiral encoder signal and an inverted spiral encoder signal. An interpolation processing is performed for the spiral encoder signal and the inverted spiral encoder signal obtained from the first sensor unit 301 by an arctangent calculation in the signal processing circuit 401, and as a result a spiral pattern signal θspiral_1 and an inverted spiral pattern signal θspiral_2 are obtained.

A divergent light emitted from an LED 310 inside the second sensor unit 302 is illuminated onto the radial pattern 502 of the rotary scale 201 to be reflected to a photo diode array inside the second sensor unit 302. The light received by the photo diode array is converted into an electric signal to be sent to the signal processing circuit 401 as an incremental encoder signal. An interpolation processing is performed for the incremental encoder signal obtained from the second sensor unit 302 by an arctangent calculation in the signal processing circuit 401, and as a result an increment output θinc is obtained.

An upper-level absolute signal θspiral is obtained by the calculation represented as the following Expression (8).

$$\theta spiral=(\theta spiral\_1-\theta spiral\_3)/2 \quad (8)$$

In this case, due to turning back of the phase, the signal is treated as two cycles in one circle and positions symmetric by 180 degrees to each other cannot be determined, but it can be determined by using a memory or adding zone detection. It can be determined by storing the relation between θspiral_1 and θspiral. The eccentricity correction signal Err is obtained by the calculation represented as the following Expression (9).

$$Err=(\theta spiral\_1+\theta spiral\_3)/2 \quad (9)$$

The relation illustrated in a graph of FIG. 16 is obtained when a lateral axis indicates the rotation angle and a vertical axis indicates the spiral pattern signals θspiral_1 and the inverted spiral pattern signal θspiral_2. Furthermore, the relation illustrated in a graph of FIG. 17 is obtained when a vertical axis indicates an error amount caused by the eccentricity of the increment output θinc. When the first sensor unit 301 and the second sensor unit 302 have a relation of 90 degrees different from each other with respect to the rotation axis of the rotary scale 201, the phase of this error is equal to the phase of the eccentricity correction signal Err. When the detection pitches of the first sensor unit 301, the second sensor unit 302, and the third sensor unit 303 are equal to each other, their error amplitudes are also equal to each other. Even if the detection pitches are different from each other, the embodiment is applicable by multiplying the eccentricity correction signal Err by a factor corresponding to a sensitivity ratio.

Next, a real angle detection operation will be described. The eccentricity correction signal Err is subtracted from the increment output θinc based on the above theory to correct the error caused by the eccentricity. Based on the upper-level absolute signal θspiral and the correction result of the increment output θinc obtained as described above, an absolute angle position signals in which eccentric errors are suppressed can be obtained over the entire circumference.

In the present embodiment, a reflective encoder is used, but a transmissive encoder may also be used. The light receiving element and the light emitting element may also be configured separately. Furthermore, any one of the spiral pattern and the inverted spiral pattern can be a concentric pattern.

According to the present embodiment, since the read sensors of the spiral and inverted spiral patterns are integrated, the user friendliness for attachment is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-136294, filed on Jun. 15, 2010, which is hereby incorporated by reference herein in its entirety.

What is claimed is:

1. A rotary encoder comprising:
   a scale including a first pattern and a second pattern different from the first pattern and configured to be rotatable around a rotation axis;
   a light source configured to illuminate a light onto the scale;
   a first detector configured to detect a light transmitted through or reflected on the first pattern to output a first detection signal;
   a second detector configured to detect a light transmitted through or reflected on the second pattern to output a second detection signal; and
   a controller configured to generate an eccentricity correction signal based on the first detection signal to correct the second detection signal based on the eccentricity correction signal,
   wherein one of the first pattern and the second pattern is a spiral pattern that is spirally formed around the rotation axis to detect a rotational angular displacement larger than a predetermined value, and
   wherein the other one of the first pattern and the second pattern is a radial pattern that is radially formed around the rotation axis to detect a rotational angular displacement smaller than the rotational angular displacement detected by the spiral pattern.

2. The rotary encoder according to claim 1,
   wherein the spiral pattern is formed inside the radial pattern with respect to the rotation axis.

3. The rotary encoder according to claim 1, further comprising a storage unit configured to store a relationship of the first detection signal, the second detection signal, and the eccentricity correction signal,
   wherein the first pattern is the spiral pattern and the second pattern is the radial pattern, and
   wherein the controller is configured to correct the second detection signal based on the first detection signal and the relationship stored in the storage unit.

4. The rotary encoder according to claim 3,
   wherein the first detector is disposed at a position rotated by 90 degrees around the rotation axis with respect to the second detector.

5. The rotary encoder according to claim 1,
   wherein the first detector includes two detecting parts that detect the light transmitted through or reflected on the first pattern, and
   wherein the controller is configured to generate the eccentricity correction signal based on the first detection signal detected by the two detecting parts to correct the second detection signal.

6. The rotary encoder according to claim 5,
   wherein the two detecting parts are disposed at positions rotated by 180 degrees from each other around the rotation axis.

7. The rotary encoder according to claim 6,
   wherein the second detector is disposed at a position rotated by 90 degrees around the rotation axis with respect to the two detecting parts.

8. The rotary encoder according to claim 5,
   wherein the first pattern is the spiral pattern and the second pattern is the radial pattern.

9. The rotary encoder according to claim 5,
   wherein the first pattern is the radial pattern and the second pattern is the spiral pattern.

10. The rotary encoder according to claim 1,
    wherein the spiral pattern includes a first spiral pattern formed in a first direction and a second spiral pattern formed in a second direction opposite to the first direction.

* * * * *